Patented Mar. 22, 1949

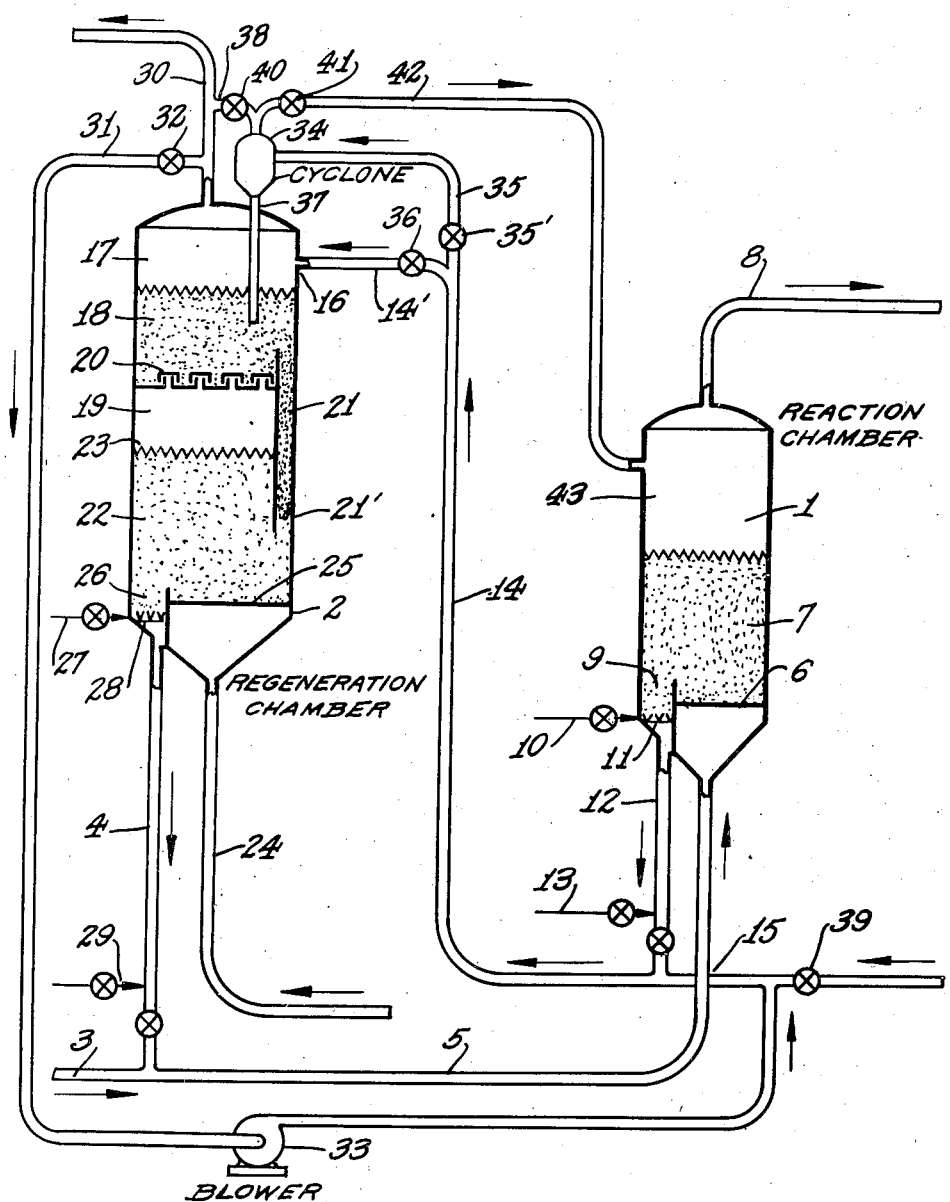

2,465,255

UNITED STATES PATENT OFFICE 2,465,255

HYDROCARBON CONVERSION PROCESS

Joseph W. Moorman, Alpine, N. J., assignor to The M. W. Kellogg Company, Jersey City, N. J., a corporation of Delaware Application July 18, 1946, Serial No 684,464

5 Claims. (Cl. 196—52)

The present invention, in its specific aspects, relates to improvements in processes for the catalytic conversion of hydrocarbons by a cyclic procedure. Such processes are represented by those presently commercially practiced for the cracking of high boiling hydrocarbons to gasoline, and analogous conversions by the so-called "fluid catalyst" procedure.

In the latter type of operation finely divided or pulverulent particles of catalytic material are successively and cyclically circulated through a conversion and a regeneration zone. In the conversion zone, the particles of catalyst are contacted with the hydrocarbons undergoing cracking, or other conversion reactions, at an elevated temperature and for a period of time sufficient to bring about the desired catalytic conversion, and which also results in the formation of a deposit of vaporizable and unvaporizable contaminants of carbonaceous material on the catalyst of complex composition including both carbon and hydrogen. Upon separation and withdrawal from the vapors undergoing conversion, the used catalyst is passed to a regeneration zone and contacted therein with an oxygen-containing gas under suitable conditions to remove the carbonaceous deposit by combustion without detrimentally affecting the catalytic activity of the catalyst particles by overheating.

During the transfer of the used catalyst between the conversion and the regeneration zones, it is customary to subject it to a purging, or stripping, treatment with an inert gas, such as steam, flue gas or the like, to reduce the quantity of carbonaceous material present on the catalyst particles upon introduction to the regeneration zone, and the provision of improvements in the mode of operation and efficiency of the purging treatment is a primary object of this invention.

Heretofore, a method proposed for purging the finely divided catalyst generally involved simple countercurrent flow of the used catalyst particles and the purging gas. Pursuant to the latter procedure, the used catalyst particles are permitted to fall through a vertical purging column in contact with an upwardly flowing stream of the purging medium. In this manner the used catalyst particles during their flow downwardly through the column are contacted with a stream of purging gas of constantly increasing purity from the standpoint of the concentration of purgable material therein. From theoretical standpoints, it has heretofore advisedly been considered by those skilled in the art that this type of purging treatment should provide optimum results.

Contrary to the foregoing the present invention is based upon the discovery that substantially improved results may be attained by a modified form of operation which departs radically from the simple countercurrent flow type of operation heretofore proposed and used.

In accordance with the process provided by this invention the catalyst particles while at the elevated temperature to which they are heated in the conversion zone are flowed as a fluid mass of aerated particles downwardly in countercurrent contact with a stream of purging gas in a first stage or preliminary purging procedure. Subsequent to this treatment the catalyst particles are injected into a flowing stream of gas which may be inert, such as steam, flue gas or the like, or an oxygen-containing gas, such as air, and contacted concurrently therewith and conveyed to a gas-solids separating means which may be the dilute catalyst phase in a fluid catalyst zone or a cyclone wherein substantially complete separation is made between the catalyst particles and the gas. Thereafter, the catalyst particles are injected into a dense phase bed of catalyst particles in a purging zone preferably superimposed immediately over the regenerating zone so that they are maintained in a fluid condition by the uncompressed highly heated gaseous products of combustion passing upwardly therethrough directly from the regeneration zone. The time at which the catalyst particles is maintained in fluid contact with the highly heated combustion products is of sufficient duration to substantially completely remove the vaporizable carbonaceous contaminants associated therewith as a result of the conversion reaction, leaving only unvaporizable carbonaceous contaminants to be removed by combustion. Further features and advantages of the invention will be apparent from the following detailed description thereof, given with reference to the appended drawing showing diagrammatically a vertical sectional elevation of a suitable form of apparatus for its practice.

In the drawing, numeral 1 indicates the reaction chamber for catalytic cracking of the "fluid catalyst" type and 2 indicates a chamber for regenerating the used catalyst particles from reaction chamber 1, in combination with a suitable form of apparatus for effecting the purging operation pursuant to this invention. The reaction chamber illustrated is of the type wherein the pulverulent, or powdered, catalyst is both supplied and withdrawn from the lower portion of the reaction chamber, this type being regarded as preferable. The process, however, is also applicable to those cracking conversion systems wherein both the used powdered catalyst and reaction vapors are withdrawn overhead from the reaction chamber.

In the type of operation illustrated a suspension of the high-boiling hydrocarbon vapors to undergo treatment is supplied through line 3. These vapors pick up fresh and/or regenerated catalyst from the standpipe 4 whereafter both the hydrocarbon vapors and the catalyst are conveyed through transfer line 5 to a suitable distributing means such as a grid 6. The quantity of vapors and catalyst supplied is such as to produce a relatively dense turbulent fluidized phase of the catalyst in the reaction chamber. The hydrocarbon vapors pass upwardly through the dense catalyst phase, commonly called dense phase bed, which is indicated by the numeral 7 and during their contact therewith undergo the desired conversion reaction. The vaporous reaction products are withdrawn through line 8 to a products recovery system not shown. Due to the extensive turbulence and internal recycle of the catalyst particles produced under these conditions by the reaction vapors, the catalyst is of substantial uniform composition throughout the dense phase bed, and may be suitably withdrawn from any point therein by gravity flow even from a lower portion thereof closely adjacent the incoming feed vapors by withdrawal passage 9, as illustrated. The catalyst is maintained in a fluid condition while flowing through passage 9 by a suitable aeration medium supplied through valved line 10 and the associated distributor 11. From passageway 9, the catalyst is withdrawn through a suitable standpipe 12 in which the catalyst likewise may be maintained in a fluid flowable state by means of aerating fluid supplied through valved line 13. Heretofore it has been the practice to depend upon the simple countercurrent stripping action effected by the aeration means such as is supplied through lines 10 and 13 to effect the desired purging of the used catalyst.

Pursuant to the present process the used catalyst is passed to transfer line 14 by gravity flow, or otherwise, wherein it is picked up by a gaseous medium, such as steam, flue gas, air or the like, being supplied to line 14 from line 15. In its passage through this line, the catalyst may be maintained in a free-flowing state which preferably is a more dilute phase than that maintained either in dense phase bed 7 or standpipe 12. Line 14 connects with line 14', valve 35' being closed, which line terminates in an upper part of regeneration chamber 2, at an intermediate point such as is indicated by the numeral 16, whereupon the catalyst and the gaseous material enter the dilute catalyst phase of the upper section 17 of regeneration chamber 2. On entering the upper section 17, the catalyst separates from the gaseous medium and any vaporous material purged thereby and falls by gravity into the dense phase bed 18 of section 17. Gaseous products of combustion enter the dense phase bed 18 directly from regeneration section 19 of regeneration chamber 2 through dispersion means 20 which may be a grid or constructed similar to the bubble caps common in the distillation of liquid materials, or otherwise. The quantity of gases and catalyst supplied to section 17 is such as to produce a relatively dense turbulent fluidized phase of the catalyst in dense phase bed 18.

The hot gases pass upwardly through the dense catalyst phase and during their contact therewith purge, by decomposition and/or stripping, the catalyst particles of substantially all the vaporizable material associated with the catalyst as the result of the cracking reaction in reaction chamber 1. The gases thereafter leave the system by way of line 30. Due to the extensive turbulence and internal recycle of the catalyst particles produced under these conditions, the catalyst is uniformly purged of vaporizable contaminants and is of substantial uniform composition as to its associated unvaporized contaminants throughout the dense phase, and may be suitably withdrawn from any point therein by gravity flow such as by passage 21. The purged catalyst is introduced into dense phase bed 22 of section 19 of the regeneration chamber 2 preferably, but not necessarily, at a point below the top level, or interface 23 in quantities regulated by a control mechanism which may be a butterfly valve 21' as shown on the drawing or any other suitable means.

An oxygen-containing gas, such as air, is supplied to the lower, or regeneration, section 19 of regeneration chamber 2 through line 24 and distributing grid 25. A sufficient quantity of this gas is thus applied to maintain the catalyst in a dense fluidized condition and to burn a desired amount of the deposit of unvaporized carbonaceous material from the purged catalyst particles. In dense phase bed 22, as in dense phase beds 7 and 18, the extensive turbulence and internal recycle of the catalyst particles, produced by the catalyst and gases supplied to the bed, cause the unvaporized contaminants to be uniformly burned from the catalyst throughout the entire bed. This results in effecting a regenerated catalyst having a substantially uniform distribution of residual carbon content throughout the dense phase. Hence, the regenerated catalyst may be withdrawn at a controlled rate from any point therein by gravity flow, even from a lower portion of bed 22 closely adjacent the incoming oxygen-containing gas, by passage 26. The catalyst is maintained in a fluid condition while flowing through passage 26 by a suitable aerating medium supplied through valved line 27 and the associated distributor 28. From passage 26, the catalyst is withdrawn through a suitable standpipe 4 in which the catalyst also may be maintained in a fluid flowable state by means of aerating fluid supplied through valved line 29. It is sufficient to depend upon the simple countercurrent stripping action effected by stripping means such as lines 27 and 29 to effect the desired purging of the regenerated catalyst prior to its introduction into the reaction chamber 1 through line 5.

Various modifications in the apparatus and process flow illustrated in the drawing may be employed. Pursuant to one modification combustion product gases are employed to convey the catalyst through line 14. As a preferable source of this material, a portion of the gas exiting thru line 30 is diverted therefrom through line 31, having valve 32, and impelled therethrough by blower 33 to line 15. The catalyst and conveying gas thereafter are separated in the upper section 17 of regeneration chamber 2. If desired the flow of the catalyst particles in line 14 may be modified as to pass to a cyclone separator 34 and the separation effected in this vessel. In this event the line section 14' of line 14 may be omitted and replaced by line section 35 or, as shown on the drawing, the catalyst flow may be diverted into line section 35 by closing valve 36 and opening valve 35'. The catalyst separated in cyclone 34 is introduced into dense phase bed 18 by way of dip-leg 37 while the gaseous combustion products are withdrawn through valved line 38 to line 30.

In the event steam is employed in line 14, this gaseous conveying medium is injected into line 14 from line 15 in quantities controlled by valve 39. According to this modification, the catalyst preferably is separated from the steam in cyclone separator 34. Line 38 is then employed to vent the separated steam to withdrawal line 30 unless it is found desirable to recover hydrocarbon constituents from the conveying medium. In this event line 38 may be omitted, or as shown on the drawing, valve 40 is closed, valve 41 opened, and the vapors from cyclone 34 caused to flow through line 42 for introduction into the dilute catalyst phase zone 43 of reaction chamber 1. Recovery of the hydrocarbon constituents is thereafter readily effected in the hydrocarbon recovery system, not shown on the drawing.

While the invention is not confined to any particular theory of operation, the improved results secured compared to those produced by simple countercurrent stripping which theoretically would be the optimum procedure, are believed to be due to several factors. One of these is the prolonged residence time of the catalyst particles in a physical state of aggregation and at a temperature greatly exceeding the temperature of the cracking reaction. This provides for the vaporization from the catalyst of carbonaceous material most difficult to vaporize either by normal vaporization or by decomposition of the carbonaceous substance adsorbed by the catalyst particles. Further, the foregoing effect is enhanced by supplying the purging fluid, without the necessity of mechanical compression, substantially at the moment of its formation thereby utilizing the residual amount of uncombined oxygen contained therein to assist in the decomposition of the contaminants most difficult to vaporize. As withdrawn from the cracking reaction, the catalyst particles normally will be at a temperature of about 850 to 950° F., and as withdrawn from the regeneration chamber at about 1000 to 1100° F. Hence, the hot product gases of combustion rising immediately through the dispersion means 20 will effectively maintain the catalyst particles in dense phase bed 18 at a temperature of at least 1000° F. and provide for stripping at maximum temperature level existing in the system.

I claim:

1. In the method of catalytically converting hydrocarbons wherein catalyst in finely divided condition is contacted with a vaporous hydrocarbon undergoing conversion at an elevated temperature in a conversion zone for a period of time sufficient to effect the desired conversion reaction with resultant deposition of vaporizable and unvaporizable carbonaceous material on the catalyst and wherein catalyst removed from said conversion zone is contacted with an oxygen-containing gas in a regeneration zone at a temperature higher than said temperature for conversion to regenerate the catalyst for use in the conversion zone, the improvement which comprises withdrawing catalyst from the conversion zone, suspending the withdrawn catalyst as a dilute suspension in hot gaseous products of combustion from a subsequent stripping zone substantially free of oxygen and at a temperature relatively higher than that in said conversion zone, passing and concurrently contacting the components of the resulting mixture of catalyst and gaseous products in an elongated conduit of restricted cross-sectional area whereby vaporizable carbonaceous deposits are stripped from said catalyst, then passing said resultant mixture into a stripping zone, maintaining in said stripping zone a lower dense fluidized phase and an upper dilute phase of catalyst, said resulting mixture of suspended catalyst and gaseous products being introduced into said stripping zone at a point above the interface between said dense and dilute phases whereby the catalyst separates from said gaseous products and falls into said dense phase, passing hot gaseous products of combustion of relatively low oxygen content from a subsequent catalyst regeneration upwardly through said dense fluidized phase under conditions such that further vaporizable carbonaceous deposits are removed from the catalyst, removing from the dense fluidized phase of said stripping zone catalyst containing non-vaporized carbonaceous deposits thereon and passing same to said regeneration zone, subjecting said catalyst removed from the stripping zone to combustion conditions by contacting with a gaseous mixture of relatively high oxygen content whereby the unvaporized carbonaceous deposits are burned and the catalyst is regenerated, recovering regenerated catalyst from said regeneration zone, passing a gaseous effluent from said regeneration zone directly to said hot stripping zone as said gaseous products of combustion of relatively low oxygen content, removing from the upper portion of said stripping zone a gaseous effluent and employing a portion thereof as said hot gaseous products of combustion substantially free of oxygen for use in suspending and concurrently contacting said catalyst removed from said conversion zone in said elongated conduit.

2. In the method of catalytically converting hydrocarbons wherein catalyst in finely divided condition is contacted with a vaporous hydrocarbon undergoing conversion at an elevated temperature in a conversion zone for a period of time sufficient to effect the desired conversion reaction with resultant deposition of vaporizable and unvaporizable carbonaceous material on the catalyst and wherein catalyst removed from said conversion zone is contacted with an oxygen-containing gas in the dense fluidized phase of catalyst in a regeneration zone at a temperature higher than said temperature for conversion to regenerate the catalyst for use in the conversion zone, the improvement which comprises withdrawing catalyst from the conversion zone, suspending the withdrawn catalyst as a dilute suspension in hot gaseous products of combustion from a subsequent stripping zone substantially free of oxygen and at a temperature relatively higher than that in said conversion zone, passing and concurrently contacting the components of the resulting mixture of catalyst and gaseous products in an elongated conduit of restricted cross-sectional area whereby vaporizable carbonaceous deposits are stripped from said catalyst, then passing said resulting mixture into a stripping zone, maintaining in said strippng zone a lower dense fludized phase and an upper dilute phase of catalyst, said resulting mixture of suspended catalyst and gaseous products being introduced into said stripping zone at a point above the interface between said dense and dilute phases whereby the catalyst separates from said gaseous products and falls into said dense phase, passing hot gaseous products of combustion of relatively low oxygen content from a subsequent catalyst regeneration upwardly through said dense fluidized phase under conditions such that further vaporizable carbonaceous deposits are removed from the catalyst, removing from the dense fluidized phase of said stripping zone catalyst containing non-vaporized carbonaceous deposits thereon and passing same to said dense fluidized phase of catalyst in said regeneration zone, subjecting said catalyst removed from the stripping zone to combustion conditions by contacting with a gaseous mixture of relatively high oxygen content whereby the unvaporized carbonaceous deposits are burned and the catalyst is regenerated, recovering regenerated catalyst from said dense fluidized phase of catalyst in said regeneration zone, passing a gaseous effluent from said regeneration zone directly to said stripping zone as said hot gaseous products of combustion of relatively low oxygen content, removing from the upper portion of said stripping zone a gaseous effluent and employing a portion thereof as said hot gaseous products of combustion substantially free of oxygen for use in suspending and concurrently contacting said catalyst removed from said conversion zone in said elongated conduit.

3. In a catalytic conversion process wherein finely divided catalyst becomes contaminated with vaporizable and unvaporizable carbonaceous material and wherein used catalyst from said conversion process is regenerated by being subjected to combustion with an oxygen-containing gas, the improvement which comprises suspending the used catalyst prior to regeneration as a dilute suspension in hot gaseous products of combustion substantially free of oxygen from a subsequent stripping zone, concurrently contacting and conveying the used catalyst with the hot gaseous products employed for said suspension in an elongated conduit of restricted cross-sectional area to a stripping zone whereby vaporizable carbonaceous material is stripped from the catalyst, maintaining in said stripping zone a lower dense fluidized phase and an upper dilute phase of catalyst, introducing the suspension of catalyst in said gaseous products into said dilute phase whereby the catalyst separates from the gaseous products and falls into said dense phase, passing hot gaseous products of combustion of relatively low oxygen content from a subsequent catalyst regeneration upwardly through said dense fluidized phase under conditions such that further vaporizable carbonaceous material is removed from the catalyst, removing from the dense fluidized phase of said stripping zone catalyst containing non-vaporized carbonaceous material thereon and passing same to a regeneration zone, subjecting said catalyst from said stripping zone to combustion conditions with a gaseous mixture of relatively high oxygen content whereby the unvaporized carbonaceous material is burned and the catalyst is regenerated, recovering regenerated catalyst from said regeneration zone, passing a gaseous effluent from said regeneration zone directly to said hot stripping zone as said gaseous products of combustion of relatively low oxygen content, removing from the upper portion of said stripping zone a gaseous effluent and employing a portion thereof as said hot gaseous products of combustion substantially free of oxygen for use in suspending, concurrently contacting and conveying said used catalyst in said elongated conduit.

4. In the method of catalytically converting hydrocarbons wherein catalyst in finely divided condition is contacted with a vaporous hydrocarbon undergoing conversion at an elevated temperature in a conversion zone for a period of time sufficient to effect the desired conversion reaction with resultant deposition of vaporizable and unvaporizable carbonaceous material on the catalyst and wherein catalyst removed from said conversion zone is contacted with an oxygen-containing gas in a regeneration zone at a temperature higher than said temperature for conversion to regenerate the catalyst for use in the conversion zone; the improvement which comprises withdrawing catalyst from the conversion zone, suspending the withdrawn catalyst as a dilute suspension in hot gaseous products of combustion. substantially free of oxygen and at a temperature relatively higher than that in said conversion zone, from a subsequent stripping zone, concurrently contacting the components of said suspension in an elongated conduit of restricted cross-sectional area whereby vaporizable carbonaceous material is stripped from the catalyst, passing said components to a catalyst separating zone and separating therein the catalyst from said gaseous products and stripped vaporizable carbonaceous material, passing the thus separated catalyst to a stripping zone, maintaining in said stripping zone a lower dense fluidized phase and an upper dilute phase of catalyst, passing hot gaseous products of combustion of relatively low oxygen content from a subsequent catalyst regeneration upwardly through said dense fluidized phase under conditions such that further vaporizable material is removed from the catalyst, removing from the dense fluidized phase of said stripping zone catalyst containing non-vaporized carbonaceous material thereon and passing same to said regeneration zone, subjecting said catalyst removed from the stripping zone to combustion conditions by contacting with a gaseous mixture of relatively high oxygen content whereby the unvaporized carbonaceous material is burned and the catalyst is regenerated, recovering regenerated catalyst from said regeneration zone. passing a gaseous effluent from said regeneration zone directly to said stripping zone as said hot gaseous products of combustion of relatively low oxygen content, removing from the upper portion of said stripping zone a gaseous effluent and employing a portion thereof as said hot gaseous products of combustion substantially free of oxygen for use in concurrently contacting said dilute suspension of catalyst in said elongated conduit.

5. In the method of catalytically converting hydrocarbons wherein catalyst in finely divided condition is contacted with a vaporous hydrocarbon undergoing conversion at an elevated temperature in a conversion zone for a period of time sufficient to effect the desired conversion reaction with resultant deposition of vaporizable and unvaporizable carbonaceous material on the catalyst and wherein catalyst removed from said conversion zone is contacted with an oxygen-containing gas in a regeneration zone at a temperature higher than said temperature for conversion to regenerate the catalyst for use in the conversion zone; the improvement which comprises withdrawing catalyst from the conversion zone, suspending the withdrawn catalyst as a dilute suspension in hot gaseous products of combustion, substantially free of oxygen and at a temperature relatively higher than that in said conversion zone, from a subsequent stripping zone, concurrently contacting the components of said suspension in an elongated conduit of restricted cross-sectional area whereby vaporizable carbonaceous material is stripped from the catalyst, passing said components to a catalyst separating zone and separating therein the catalyst from said gaseous products and stripped vaporizable carbonaceous material, passing the thus separated catalyst to a stripping zone maintaining in said stripping zone a lower dense fluidized phase and an upper dilute phase of catalyst, passing the thus separated catalyst directly into said lower dense fluidized phase of the stripping zone, passing hot gaseous products of combustion of relatively low oxygen content from a subsequent catalyst regeneration upwardly through said dense fluidized phase under conditions such that further vaporizable material is removed from the catalyst, removing from the dense fluidized phase of said stripping zone catalyst containing non-vaporized carbonaceous material thereon and passing same to said regeneration zone, subjecting said catalyst removed from the stripping zone to combustion conditions by contacting with a gaseous mixture of relatively high oxygen content whereby the unvaporized carbonaceous material is burned and the catalyst is regenerated, recovering regenerated catalyst from said regeneration zone, passing a gaseous effluent from said regeneration zone directly to said stripping zone as said hot gaseous products of combustion of relatively low oxygen content, removing from the upper portion of said stripping zone a gaseous effluent and employing a portion thereof as said hot gaseous products of combustion substantially free of oxygen for use in concurrently contacting said dilute suspension of catalyst in said elongated conduit.

JOSEPH W. MOORMAN.

REFERENCES CITED

The following references are of record in the file of this patent:

UNITED STATES PATENTS

| Number | Name | Date |
| --- | --- | --- |
| 2,253,486 | Belchetz | Aug. 19, 1941 |
| 2,289,329 | Prickett | July 7, 1942 |
| 2,367,281 | Johnson | Jan. 16, 1945 |
| 2,385,326 | Bailey | Sept. 25, 1945 |
| 2,429,359 | Kassel | Oct. 21, 1947 |